UNITED STATES PATENT OFFICE.

ALEX B. DAVIS, OF INDIANAPOLIS, INDIANA, ASSIGNOR TO THE ELI LILLY AND COMPANY, OF INDIANAPOLIS, INDIANA, A CORPORATION OF INDIANA.

COMPOUNDS OF CINCHONA ALKALOIDS AND 2-PHENYL-QUINOLIN-4-CARBOXYLIC ACID.

1,212,464.  Specification of Letters Patent.  Patented Jan. 23, 1917.

No Drawing.  Application filed June 7, 1916. Serial No. 102,316.

*To all whom it may concern:*

Be it known that I, ALEX B. DAVIS, a citizen of the United States, residing at Indianapolis, Marion county, and State of Indiana, have invented and discovered certain new and useful Improvements in Compounds of Cinchona Alkaloids and 2-Phenyl-Quinolin-4-Carboxylic Acid, of which the following is a specification.

The invention relates to a combination of a cinchona alkaloid, particularly quinin, with 2-phenyl-quinolin-4-carboxylic acid. It is of value in medicine as an antipyretic, antiphlogistic and uric acid eliminant.

The compound is made by adding a solution of a salt of quinin or other cinchona alkaloid to a solution of an alkali salt of 2-phenyl-quinolin-4-carboxylic acid.

In detail the process may be carried out as follows: 137 grams of quinin bisulfate $C_{20}H_{24}N_2O_2 \cdot H_2SO_4 \cdot 7H_2O$ are dissolved in nine-hundred c. c. of water at 85° C., and into this is quickly poured with stirring a solution of 124.5 grams of 2-phenyl-quinolin-4-carboxylic acid in 800 c. c. of water and just sufficient caustic soda to neutralize it. The quinin-di-acid salt quickly separates as a sticky mass which quickly solidifies to a mass of crystals. The mass is broken up, filtered from the water, washed so with water and dried at a low temperature, when it appears as a nearly tasteless white, crystalline powder, almost insoluble in water, decomposed by alkalis, soluble in hot acetone and alcohol.

What I claim is:—

1. A compound of a cinchona alkaloid and 2-phenyl-quinolin-4-carboxylic acid.

2. A compound of quinin and 2-phenyl-quinolin-4-carboxylic acid.

3. Quinin-di-2-phenyl-quinolin-4-carboxylate.

In witness whereof, I have hereunto set my hand and seal at Indianapolis, Indiana, this sixteenth day of May, A. D. nineteen hundred and sixteen.

ALEX B. DAVIS. [L. S.]

Witnesses:
FRANK E. ELDRED,
H. P. DOOLITTLE.